April 29, 1924.  E. J. KYLE  1,492,134
KNIFE
Filed Sept. 15, 1923
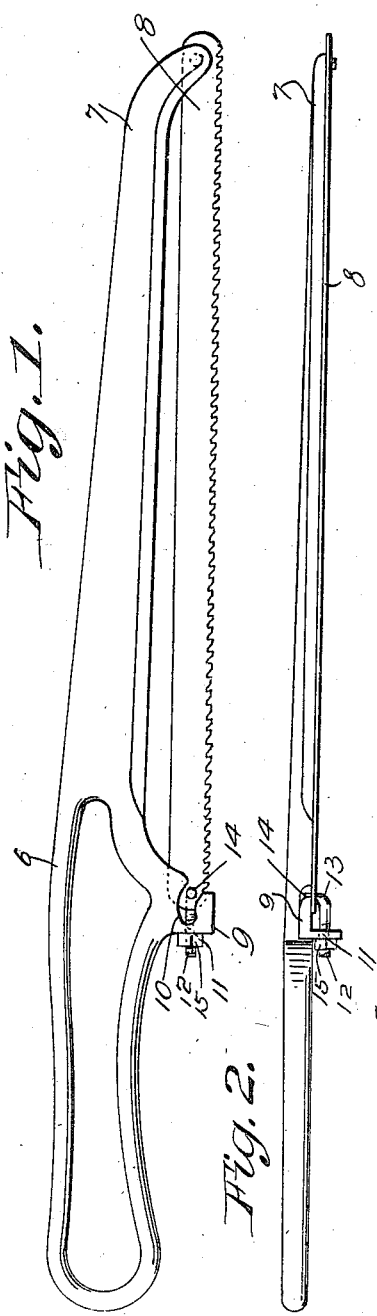
Inventor
Edward J. Kyle
Attorney Patented Apr. 29, 1924.

1,492,134

UNITED STATES PATENT OFFICE.

EDWARD J. KYLE, OF HARRISBURG, PENNSYLVANIA, ASSIGNOR OF ONE-HALF TO ELLEN MILLER, OF HARRISBURG, PENNSYLVANIA.

KNIFE.

Application filed September 15, 1923. Serial No. 662,868.

*To all whom it may concern:*

Be it known that I, EDWARD J. KYLE, a citizen of the United States of America, and resident of Harrisburg, in the county of Dauphin and State of Pennsylvania, have invented certain new and useful Improvements in Knives, of which the following is a specification.

This invention relates to saws and particularly to a saw intended for cutting bread.

An object of this invention is to provide a saw having novel teeth which, owing to their configuration, afford a clearance which will result in a clean, clear severance of the slices of bread and permit the operator to cut straight without tendency of the knife to slant in either direction.

A still further object of this invention is to provide a knife having a blade which will retain its edge for a long time as compared with knives now in general use, the said blade being durable and requiring very little sharpening to maintain its cutting edge in effective condition.

With the foregoing and other objects in view, the invention consists in the details of construction and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a knife with a blade embodying the invention forming a part thereof;

Figure 2 illustrates a plan view;

Figure 3 illustrates an enlarged detail view of a fragment of the blade;

Figure 4 illustrates a sectional view on the line 4—4 of Figure 3; and

Figure 5 illustrates a sectional view on the line 5—5 of Figure 3.

In these drawings 6 denotes the handle having an extension 7 to which one end of the blade 8 is connected. The handle has a lug 9 with a recess 10 and an aperture 11. A threaded shank 12 is inserted in the aperture and terminates in a hook 13 which is adapted to enter an opening 14 in one end of the blade so that the said blade may be held in operative relation to the handle. A nut 15 is utilized for engaging the threaded shank so that the tension of the blade may be increased according to the requirements in practice.

The blade 8 has teeth 16, each tooth having a straight side 17 and a hollow ground side 18 whereas the edges 19 and 20 of each tooth are rearwardly beveled and the cutting edge 21 of each tooth is relatively broad and straight, so that the whole of the cutting edge of each tooth is on a plane with the cutting edge of the other teeth or approximately so.

By reason of the fact that the tooth has a concaved surface, a keen cutting edge may be maintained by sharpening action and in the operation or manipulation of the knife when in use; the straight side of the tooth will insure a straight cut whereas the concaved or hollow ground side of the blade will act to force the cut portion outwardly, producing a clearance for the travel of the blade as it is reciprocated.

I claim:

In a knife, a handle, a blade comprising a body portion having teeth, said teeth each having one side straight and the other side hollow ground, the edges of the teeth being rearwardly inclined and the cutting edges being relatively broad and the cutting edges of all the teeth being approximately on a plane.

EDWARD J. KYLE.